Dec. 6, 1927.
D. E. GAMBLE
1,652,006
CLUTCH PLATE
Filed Jan. 24, 1927
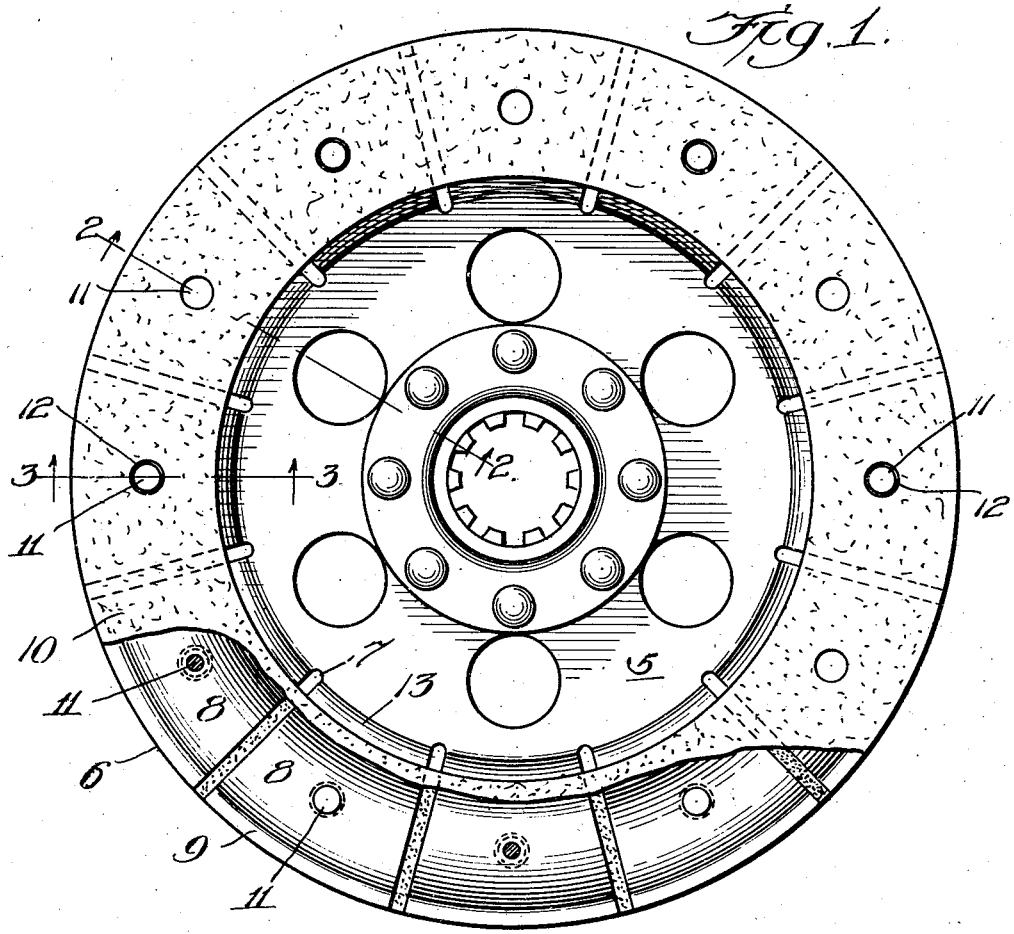
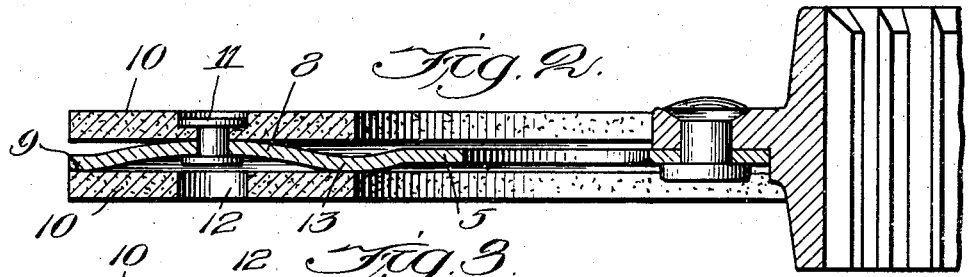
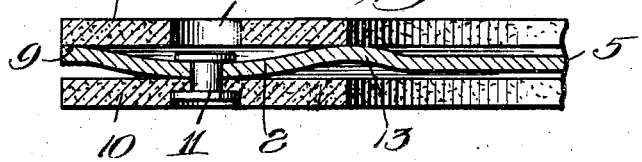
Inventor:
David E. Gamble
Wm. O. Belt
Atty.

Patented Dec. 6, 1927.

1,652,006

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH PLATE.

Application filed January 24, 1927. Serial No. 163,082.

This invention relates to friction clutches of the kind wherein a friction plate driven member is interposed between two parts of a driving member and is adapted to be gripped or clamped by the parts under sufficient pressure to impart motion from the driving member to the driven member.

The object of the invention is to provide a novel clutch plate with friction rings which will take hold smoothly and evenly throughout their contact area when pressure is initially applied, and by a yielding but rapid progressive action make the clutch act quickly and efficiently without grabbing or jerking.

In the accompanying drawings illustrating a selected embodiment of the invention:

Fig. 1 is a side elevation of the clutch plate showing one of the friction rings partly broken away.

Fig. 2 is an enlarged sectional view on the line 2—2 of Fig. 1.

Fig. 3 is a similar view on the line 3—3 of Fig. 1.

In the drawings the clutch plate 5 is divided into a plurality of sectors 6 by radial slots 7 which extend through the periphery of the plate.

Alternate sectors are bent in a direction extending radially of the plate to provide bows 8 which project on opposite sides of the plate. The outer marginal portions 9 of the sectors are flat and are positioned in staggered relation by reason of the bowed portions so that the outer face of the flat outer marginal portion of one sector will lie slightly beyond the plane of the central portion of that side of the plate, and the outer face of the outer marginal portion of the adjacent sector will lie beyond the plane of the central portion of the other side of the plate.

I employ hard, solid, continuous friction rings 10 which are arranged on opposite sides of the plate and are fastened by rivets 11 or other suitable fastening means to the projecting bows of alternate sectors at or about the middle of the bows. Thus, one ring is fastened to alternate sectors and the other ring is fastened to the other sectors, and in released position of the clutch, the marginal portion 9 of each sector engages the ring to which the sector is not fastened. Recesses which may be conveniently made in the form of openings 12 are provided in each ring to accommodate the ends of the rivets which fasten the other ring to the sectors so that the bowed portions may be flattened under pressure to provide even engagement throughout the contacting faces of the sectors and the rings. The inner marginal portion 13 of each sector is bent reversely to the bowed central portion 8 of the sector so that a section of the plate extending radially through a sector will show the sector having the shape of a reverse curve, the bowed part 8 being considerably larger than the bent or bowed part 13, and the outer marginal portion 9 of each sector being substantially flat and slightly offset from the plane of the plate. The outer face of the outer marginal portion 9 and the outer face of the inner marginal portion 13 of each sector lie in the same plane to engage the friction ring to which the sector is not fastened. The central portion of the plate is disposed in a plane substantially midway between the two friction rings, the bowed portion 8 of each sector is fastened to the ring with which it contacts, and the marginal portions 9 and 13 of each sector engage the ring to which the sector is not fastened. The portion 13 of one sector is bent in a direction opposite to the bend of that portion of the next adjacent sector. The construction is such that each sector contacts centrally with one friction ring and at its outer and inner margins with the other friction ring.

My improved clutch plate is adapted to be arranged between two parts of a driving member of a clutch to be gripped and clamped thereby for imparting motion from the driving member to the driven member. The outer faces of the friction rings make engagement throughout their entire area with the two parts of the driving member when the pressure is initially applied, and the bows of the sectors provide for a yielding gripping or clamping engagement between the friction rings of the plate and the two parts of the driving member of the clutch to insure that the clutch will take hold smoothly and easily when thrown in. The full engagement between each friction ring and a part of the driving member prevents uneven wear of the ring and prolongs the life of the ring; and the yielding, rapid, progressive action of the rings provides a clutch which acts quickly without grabbing or jerking. By fastening the bow of each sector to one ring and arranging the outer and inner marginal portions 9 and 13 of each sector in engagement with the opposite ring, to which the sector is not fastened, I provide an evenly balanced assembly and relatively stiff construction which will insure that the friction rings will make full contact throughout their surface area with the two parts of the driving member on initial application of pressure and continue to maintain this full contact as the pressure is increased. The sector construction provides a relatively stiff but at the same time a sufficiently elastic bearing for both rings which will permit the clutch to take hold yieldingly, but in a quick, progressive action to provide an efficient and relatively quick acting clutch which operates smoothly and evenly.

I claim:

1. A clutch plate having a plurality of peripheral sectors spaced apart and radially disposed, said sectors being reversely curved, and continuous friction rings mounted on said sectors on opposite sides of the plate.

2. A clutch plate having a plurality of peripheral sectors spaced apart and radially disposed, said sectors being reversely curved, a continuous friction ring arranged on one side of the plate and fastened to alternate sectors, and a continuous friction ring arranged on the other side of the plate and fastened to the other sectors.

3. A clutch plate having a plurality of peripheral sectors spaced apart and radially disposed, said sectors being reversely curved radially of the plate, and continuous friction rings mounted on said sectors on opposite sides of the plate.

4. A clutch plate having a plurality of peripheral sectors spaced apart and radially disposed, said sectors being reversely curved radially of the plate, and continuous friction rings mounted on said sectors on opposite sides of the plate.

5. A clutch plate having a plurality of peripheral sectors spaced apart and radially disposed, said sectors being reversely curved alternately in opposite directions, and continuous friction rings arranged on opposite sides of the plate and connected to the outwardly bowed sections.

6. A clutch plate having a plurality of peripheral sectors spaced apart and radially disposed, said sectors being reversely curved alternately in opposite directions, and continuous friction rings arranged on opposite sides of said sectors, one ring being secured to the outward bows between the inner and outer margins of alternate sectors and engaging the inner and outer marginal portions of the other sectors, and the other ring being secured to the outward bows between the inner and outer margins of the other sectors and engaging the inner and outer marginal portions of the alternate sectors.

7. A clutch plate having a plurality of peripheral sectors spaced apart and radially disposed, continuous friction rings mounted on said sectors on opposite sides of the plate, alternate sectors being bent so that the inner and outer marginal portions of each sector will engage one ring and the intermediate portion of each sector will engage the other ring, and means securing the sectors to the rings with which their intermediate portions engage.

8. A clutch plate having a plurality of peripheral sectors spaced apart and radially disposed, continuous friction rings mounted on said sectors on opposite sides of the plate, alternate sectors having a substantially flat outer marginal portion and a bent inner marginal portion engaging one ring and an intermediate bowed portion engaging the other ring, and means for securing said bowed portions of the sectors to the respective rings which they engage.

9. A clutch plate having a plurality of peripheral sectors spaced apart and radially disposed, continuous friction rings mounted on said sectors on opposite sides of the plate, alternate sectors having a substantially flat outer marginal portion and a bent inner marginal portion engaging one ring and an intermediate bowed portion engaging the other ring, and means for securing said bowed portions of the sectors to the respective rings which they engage, the central portion of the plate lying in a plane between the plane of the outer face of the outer and inner marginal portions on one side and the outer face of the intermediate bowed portion on the other side of each sector.

DAVID E. GAMBLE.